United States Patent
Denne

(10) Patent No.: US 6,721,641 B1
(45) Date of Patent: Apr. 13, 2004

(54) ELECTROMAGNETIC DAMPER FOR VEHICLE SUSPENSION

(76) Inventor: Phillip Raymond Michael Denne, 7 Lyndon Gate Chine Crescent Road, Bournemouth BH2 5LW (GB)

(*) Notice: Subject to any disclaimer, the term of this patent is extended or adjusted under 35 U.S.C. 154(b) by 0 days.

(21) Appl. No.: 10/030,437

(22) PCT Filed: Jul. 4, 2000

(86) PCT No.: PCT/GB00/02561
§ 371 (c)(1),
(2), (4) Date: Apr. 22, 2002

(87) PCT Pub. No.: WO01/02198
PCT Pub. Date: Jan. 11, 2001

(30) Foreign Application Priority Data

Jul. 5, 1999 (GB) .............................. 9915709

(51) Int. Cl.⁷ .............................. B60G 7/015
(52) U.S. Cl. ..................... 701/37; 280/5.515
(58) Field of Search ................ 701/37, 38; 280/5.512, 280/5.515; 267/64.16; 188/267

(56) References Cited

U.S. PATENT DOCUMENTS

| 4,583,752 A | * | 4/1986 | Breitbach ................ 280/6.157 |
| 4,679,775 A | | 7/1987 | Funaki et al. ............ 267/64.27 |
| 4,720,085 A | | 1/1988 | Shinbori et al. ......... 267/64.16 |
| 4,912,343 A | * | 3/1990 | Stuart .......................... 310/14 |
| 5,301,111 A | | 4/1994 | Utsui et al. ............ 364/424.05 |

FOREIGN PATENT DOCUMENTS

| EP | 0 063 158 | 4/1990 |
| FR | 1 000 613 | 2/1952 |

* cited by examiner

Primary Examiner—Michael J. Zanelli
(74) Attorney, Agent, or Firm—Renner, Kenner, Greive, Bobak, Taylor & Weber

(57) ABSTRACT

A suspension system comprises a gas spring formed by two cylindrical members, one sliding within the other in combination with an electromagnetic device for applying force to or absorbing force from the gas spring under electrical control. Preferably, the gas spring and electromagnetic unit are formed as a single composite unit. The system may be used in fully-active mode e.g. in a vehicle suspension system or simply as a variable damper.

6 Claims, 3 Drawing Sheets

DIAGRAM OF DAMPING CONTROL SYSTEM FOR SEMI-PASSIVE SERVORAM SUSPENSION

ELECTROMAGNETIC DAMPER FOR VEHICLE SUSPENSION

TECHNICAL FIELD

The present invention relates to vehicle suspension systems and more particularly computer controlled systems.

BACKGROUND ART

The traditional suspension systems used on motor vehicles are many and varied in concept but are currently all passive. They might look significantly different in construction but they all share two basic components, the spring and the damper, that have a major influence on their dynamic performance. Most systems for cars use steel springs in the form of a coil, a torsion bar, or a series of leaves although the use of air, rubber and plastic composites as springing media is increasing. The damper is invariably an hydraulic device. These components are asked to satisfy the conflicting performance requirements of ride comfort and vehicle handling over a wide range of operating conditions that include large payload changes, road types and profiles. In the case of the damper a single optimum setting cannot be provided to satisfy all these requirements. A low setting is required to provide good ride comfort unless the body mass has been excited at or near its resonant frequency when a high setting is required. The high setting is also required to control both the body and wheels during handling maneuvers. The conventional damper setting is thus a compromise and is gene rally set higher than is necessary for most conditions in order to deal adequately with the relatively infrequent exceptional events. A consequence of this compromise is that the damper sometimes generates significant and undesirable forces at the wrong time.

To provide a better overall performance therefore, a variable damper with at least two fixed settings has been proposed capable of operating at either setting. The benefits achievable using multi level dampers are highly dependent on the speed at which the setting can be changed, and the separation between settings.

As an alternative, gas suspension systems have been utilised either in pure pneumatic form or as a hydropneumatic system. These systems have the advantage that the vehicle can be maintained at any predetermined height which has the additional advantage that large spring deflections are always available. Also, the driver can alter the ride height at will which is particularly advantageous for bringing a platform level with e.g. a load dock or aiding access to the vehicle.

Recently hydraulic "active suspensions" have been developed. These were designed to eliminate the inevitable pitch and roll actions of a spring suspension by rapidly changing the lengths of rigid strut between each axle and the body of a vehicle. (An active suspension of this type might be imaged to lift each wheel over a bump and to push it down into a hole as required). The problem was that it is necessary for precisely-controlled physical movement to take place continually. It will be obvious that each movement takes time to complete, limiting its ability to deal with small disturbances at high speed. A certain amount of springing has to be retained to cope with this. The peak power demand problems and the complexity of the hydraulics also make the equipment expensive and impractical for high-volume use.

SUMMARY OF THE INVENTION

The present invention proposes a suspension system where the action of a pneumatic suspension unit is modified by an electromagnetic actuator, the modification being controlled by a software based controller in order to determine the modified characteristics.

The forces generated by the electromagnetic actuator are superimposed upon those of a pneumatic spring and are rapidly and precisely ) controlled in order to produce the desired effect. The electromagnetic actuator can combined with a pneumatic spring element as two separate items or as an integral assembly. The pressure in the pneumatic spring element may be continuously adjusted in accordance with the demands on the suspension.

The system is a very high speed force modulator, unlike any other type of actuator. Nothing has to move for it to control the forces transmitted to the vehicle by the wheels. It can respond in a fraction of a millisecond, so that wheel forces may be selectively isolated from or coupled to the vehicle, to any required degree, instant by instant for every inch of the vehicle motion, even at full speed. In effect, this turns a passenger car, a truck, an off-road vehicle or a military machine into a precisely-stabilised platform, moving under real-time electronic control. The electronically-controlled system is mechanically simple and inherently reliable. It is so designed that it can double as a gas spring that automatically adjusts to road conditions, temperature variations, vehicle load distribution and so on. Further, when driven iii reverse, it turns motion energy into electricity.

The system may be used in fully-active mode, drawing power directly—from the vehicle to control the vertical forces at each wheel point, for the safest and smoothest ride possible. It can also operate in a semi-passive mode, taking power from the vertical motions of the wheels and using this to control the attitude and position of the vehicle, returning any surplus energy to a central source as electrical energy.

An advantage of using an electromagnetic actuator is that it has an armature the relative or change of position of which vis-a-vis its stator can be used to provide control signals which are supplied to the controller for one or more purposes such as control of the actuator to avoid limits of travel or to control the pneumatic spring pressure:

While reference is made to pneumatic springs and systems it is to be understood that any gas or mixture of gases can be used and not just air.

The suspension system is capable of operating in several different modes. It may be arranged to provide degraded on through a number of levels of performance

BRIEF DESCRIPTION OF THE DRAWINGS

In order that the present invention be more readily understood an embodiment thereof will now be described by way of example with reference to the accompanying drawings, in which.

BEST MODE FOR CARRYING OUT THE INVENTION

Before describing a suspension system in detail, it is thought preferable to describe the basic spring/damper unit. This will be described in relation to an integral assembly of pneumatic spring and electromagnetic damper but it will be appreciated that the two elements in the assembly could be formed separately as long as they act together.

Figure 1:
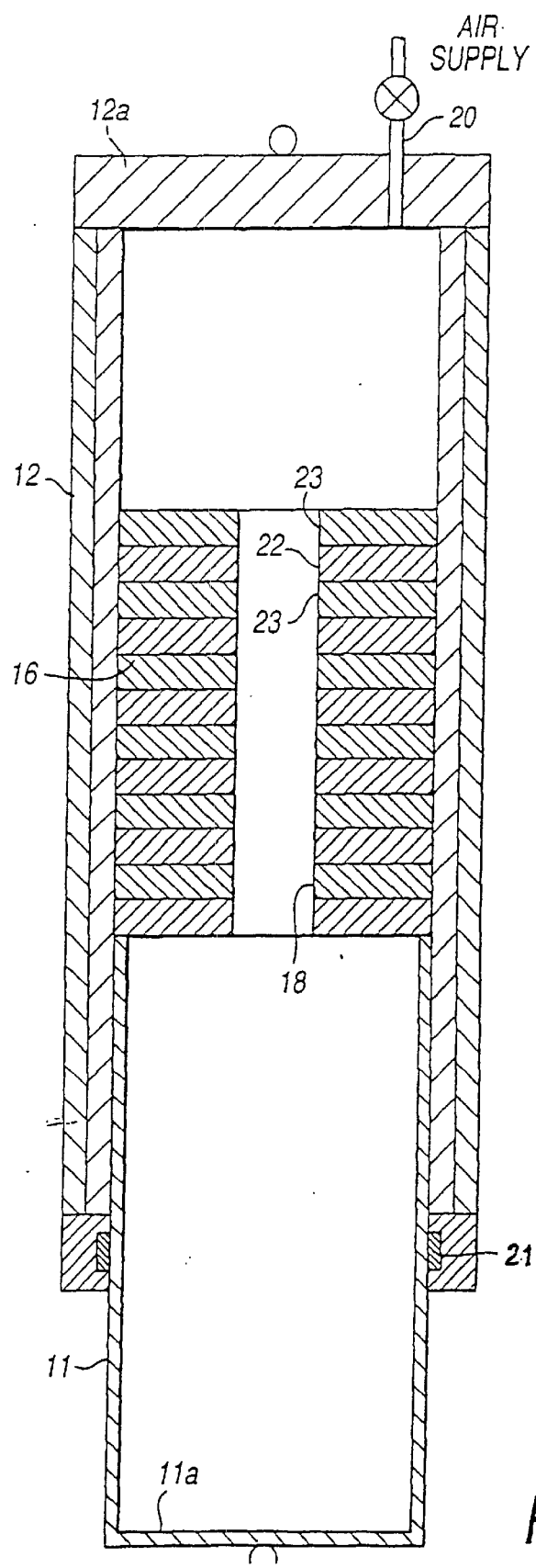
FIG. 1 is a diagrammatic sectional side view of a combined pneumatic spring and electromagnetic damper suitable for use in the present invention.

Turning now to FIG. 1, this shows an integral assembly of a pneumatic spring and electromagnetic damper. The construction is based on two cylindrical members which are preferably but not essentially of circular cross section. In fact there is some advantage in certain circumstances to the cross section being non-circular. The cylindrical members are of such a size that the member 11 is a sliding fit within the cylindrical member 12. The member 11 is closed at one end by an end wall 11a while the member 12 is closed by an end wall 12a. When fitted together, the cylindrical members 11 and 12 form a generally cylindrical member with a closed interior whose volume can be changed by sliding the member 11 within the member 12.

The cylindrical member 11 is provided at its open end with a piston like formation which partly closes the member 11 but which is provided with a hole 18 through which the interior of the member 11 communicates with the interior of the member 12.

When filled with gas via a supply port 20, the unit forms a spring whose rate is chosen according to the ratio of the enclosed volumes of the device when contracted or extended. The pneumatic force may be adjusted by varying the gas pressure within the unit at any time.

The piston armature allows precisely-controlled electromagnetic forces to be directly superimposed on the forces from the gas spring system. In the present embodiment, the armature is formed by the piston like element 16 being constructed from one or more assemblies of a magnet element in the form of a magnetic ring 22 and two mild steel ring like pole pieces 23. A stator is formed on the internal walls of the member 12 and in this case the stater is formed by a number of coils which are located along the length of the member 11. The electromagnetic forces are produced directly by the interactions between the magnetic flux from the elements of the armature and the currents in the stator coils. The actual length of the magnet rings 23 is preferably the same as the actual length of the pole pieces which in turn is the same as that of each coil unit on the stator.

The member 11 may be made of any material as it has no magnetic function and serves only to convey forces out of the cylinder. Also, it is usually required that the member 11 pass through a sliding pneumatic seal close to a bearing ring 20. Even if the damper is located in a vertical orientation, or if it is supported in a horizontal position, so that no large bearing forces exist, the outer surface of the member 11 must be hard and have a high surface finish in order to perform the sealing function.

Additionally, it has been found advantageous to line the member 12 with a lining tube to provide a hard, smooth bearing surface for the member 11 and its piston like element 16.

The lining tube should be as thin as possible since it forms part of the magnetic air gap distance. Further, it should have a high electrical loop resistance since it would otherwise act as a shorted turn relative to the electrical coils on the member 12. Additionally, thermal stresses have to be taken into consideration in the design of the assembly overall due to the sudden violent temperature changes that may occur in the coils if they are driven hard. As a result of these varying requirements, it is suggested that the lining tube might be a thin layer of hard plastics or fibrous material perhaps having a hard metal film plated on its inner surface.

Tuning now to the construction of the stator and the control of its coils, the coils are designed to be energised by an electronic drive unit operating as a three-phase machine. In other words the coils are grouped in units of threes with each unit in a group being at a different phase to its neighbours.

This is most conveniently achieved by converting an incoming power source into a DC rail voltage (if it is not DC already) and then dividing in three other DC potentials. These are so arranged that they are symmetrical about a voltage equal to half the DC rail and change as though they were 1200 out of phase with one another. As a result, the windings of the machine are energised by three quasi-DC currents. The phase of these currents is locked to the position of the piston like element 18 so that the thrust is always optimised. So that the phase of the stator current can be locked to the armature position, it is necessary for there to be a position transducer for detecting the position of the armature. This can be located at any convenient position either within the stator itself or located outside the system.

The magnitude of the current (the amplitude of the sine function or the peak value of the trapezoid) determines the value of the thrust. It is set by the parameters of a servo-control loop about a commanded position of the armature. An ancillary circuit processes an output signal that is a function of the magnitude and direction of the drive current. This controls the pressure in the gas spring with which the actuator is associated so as to minimise the system power consumption.

Due to the inevitable seal and bearing friction of the pneumatic elements and their thermodynamic losses, both of which will act degrade the isolation of the gas springs and to transmit some of the wheel forces to the vehicle. The electro-magnetic actuator is used to compensate exactly for any reaction force thus caused as well as any restoring force that arises due to vertical wheel movement.

Additionally, because the centre of mass of a vehicle is usually above the plane of the wheel points, a vehicle has a tendency to roll when turning and to pitch forward when changing speed. Conventional suspension systems are arranged to have non-zero spring rates to resist this motion. The system of the present invention can produce very powerful fast acting electromagnetic forces to hold the plane of the vehicle stable, instant by instant as the motion proceeds. Accelerometers at each individual wheel point can be arranged to command changes to the instantaneous values of the forces, producing a very strong anti-roll and anti-dive action. Because the total upward force produced by the four wheel units remains the same, the vehicle body continues at the same height.

It should be noted that the actuator does not produce a constant electromagnetic force. The electromagnetic force is modulated instant by instant so as to maintain the net force at the wheel point at such a value that the body height and attitude does not vary. The desired value of the net force changes only slowly in comparison to the electromagnetic signal (in hundreds of milliseconds rather than in fractions of a millisecond). Although an occupant in a vehicle may have the impression that the suspension unit is responding only gradually, that is not the case. Further, the gas spring pressure at each wheel point is continually optimised, averaged over a period of several seconds by a simple algorithm, so as to reduce the electrical power demands. This automatically corrects for changes in load distribution and for leaks, valve imperfections and temperature changes. In vehicle use, the simple algorithm has the effect of automatically trimming the ride height if it has been set too low for the roughness of the terrain.

Figure 2:
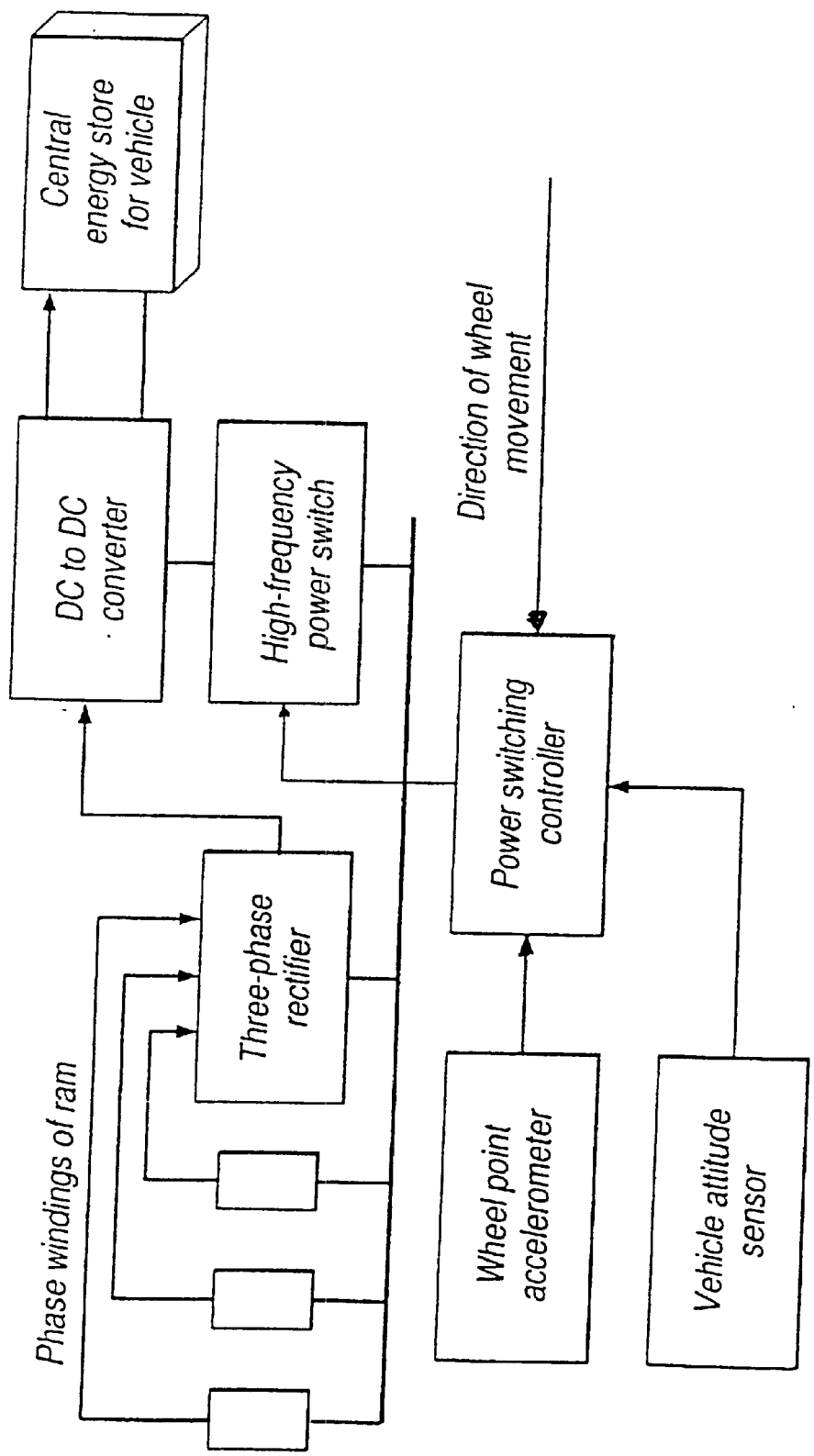
FIG. 2 is a lock diagrammatic representation of a suspension system for one wheel of a vehicle.

An alternative mode of operation is that of a dynamically-controlled damper. This is represented by the block diagram shown in FIG. 2. As the actuator piston moves, it generates electrical voltages in the control coils of the stator, proportional to the instantaneous velocity of the armature. If the coils are left open circuit, no current can flow and there is no reaction force on the piston. However, if the coils are presented with a short circuit, the reaction force can be very great, dependent on the piston velocity. Thus, by controlling the impedance of a load presented to the coils it is possible to control the velocity of the actuator (to control the damping of its motion). It should be remembered that when we refer to "damping" we actually men the degree of coupling between the vertical motion of the wheel and that of the vehicle itself. The damping coefficient of the unit shown in FIG. 1 can be changed in a fraction of a millisecond by altering the mark/space of a high frequency switching transistor that is effectively connected across the phase windings of the stator.

It is possible to make slow changes in the mean height of the vehicle by adjusting the gas spring pressure at each wheel point. However, the attitude of the vehicle can also be controlled rapidly and precisely by varying the damping coefficient of each suspension unit. For example, the appropriate suspension units may be stiffened against upward motions of the wheels to resist an unwanted pitch or roll motion but relaxed on every wheel downward motion so that the wheel may retain its grip on the road. This ability to control the motion of the wheel so that upward motion is not necessarily at the same rate as downward motion is an important advantage of the present system.

As a practical example, when moving over a nominally-level surface, the vehicle travels on its gas springs suspension. For small amplitude motions of a wheel that do not disturb the mean attitude of the vehicle, the damping coefficient is kept low so as to produce a smoother ride. However, as the vehicle begins to change its mean height or attitude outside predetermined limits, the damping is increased asymmetrically so as to stiffen the suspension against undesired motion.

In the same way that the gas spring pressure is controlled by the mean direction of the current in the windings of the suspension unit in active mode, the mean direction of the damping current may also be sensed and used in the same way to trim the average spring settings for each wheel.

It will be understood that the suspension unit shown in FIG. 1 should include a compliant element such as a rubber end stop at the lower extreme of its travel so as to produce a resilient restoring force if the active control system, the damper control system and the gas spring control system should all fail simultaneously.

Additionally, conventional vehicle dampers convert motion energy into heat which is thrown away into the slip stream. In contrast, the output of the unit shown in FIG. 1 is in the form of electrical energy a large part of which may be fed back into a central store e.g. the vehicle battery via a current transformer and conserved. In addition to being power efficient, this increases the force holding wheels in contact with the road and produces a smoother ride.

Figure 3:
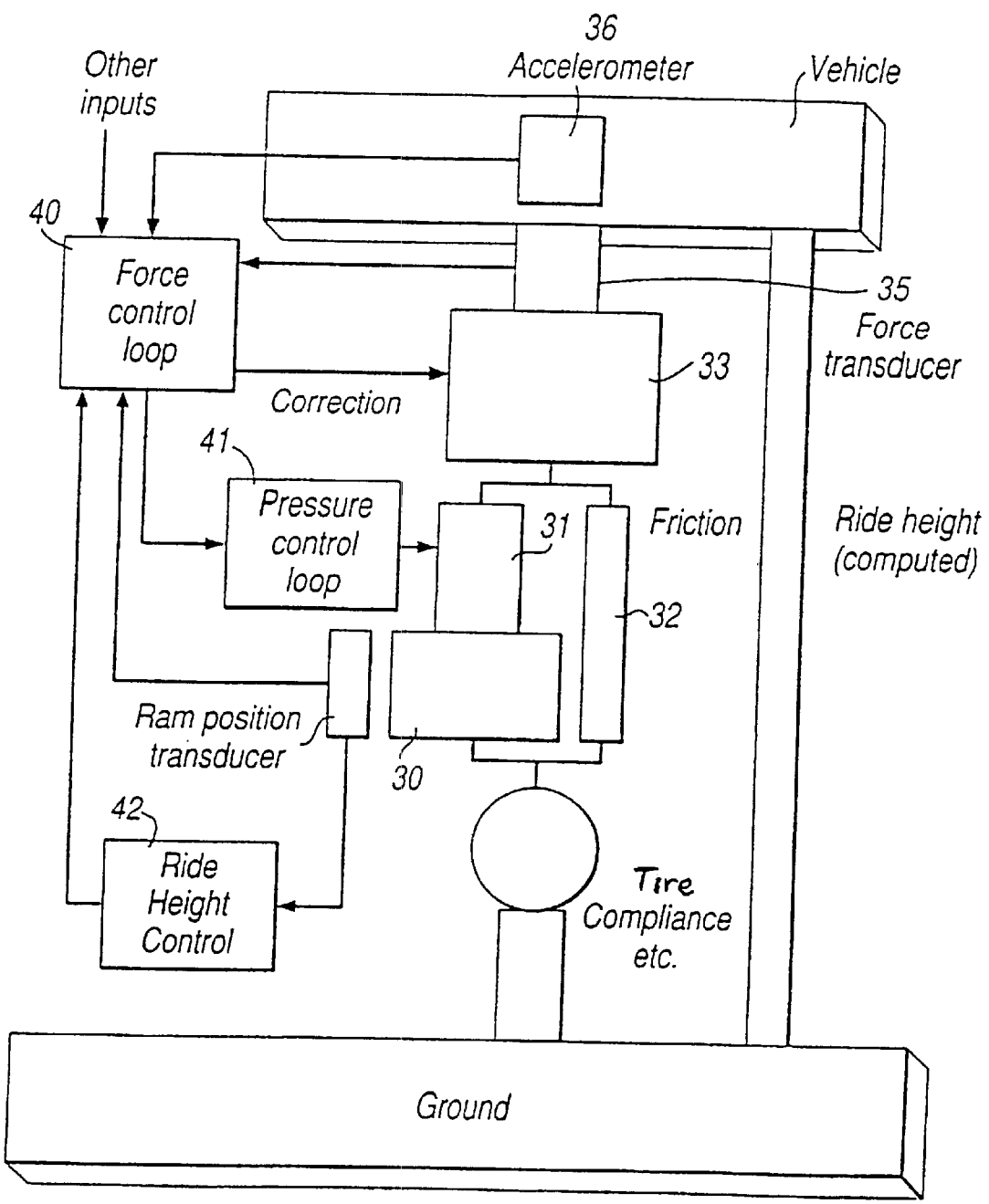
FIG. 3 is a block diagrammatic representation of an active suspension system for one wheel of a vehicle.

Turning now to FIG. 3, this shows a functional block diagram of the complete electromagnetic pneumatic suspension system. The suspension mass 30 (piston and thrust tube, plus couplings or fittings) is separated from the body of the stator by an air spring 31 but this separating is degraded by the friction in the piston bearings and seals as represented by the block 32. The electromagnetic forces act directly between the piston and the stator and override the other forces. This is represented by the block 33.

In use, the ram is placed between the wheel point on the vehicle and the wheel stub axle so as to carry all the vertical forces. Lateral forces are carried by conventional suspension arms such as wishbones.

It will be recognized that within the limits of the ram travel, the forces transferred from the wheel to the wheel point may be precisely controlled by the electromagnetic forces. A force measuring transducer 35 is used to control the current in the coil system so as to maintain the total upward force at a constant value irrespective of the wheel vertical motion. The value of this "constant" force may be determined in turn by the output from a wheel point accelerometer 36 so as to hold the vehicle steady against pitch and roll motions, for example, a force control loop system 40 receives as one input the output from the accelerometer 36, the output from the ram position transducer and, if necessary, other inputs in order to produce a signal that is processed to control the current in the coil system so as to maintain the total force at a constant value, irrespective of the wheel vertical motion. The desired "constant" value of this force is varied so as to hold the vehicle steady against pitch and roll torques, for example. The force control loop also produces a signal that is processed to control the pressure in the gas spring system. If a predominantly downward-acting force is required of the electromagnetic system, the pressure is increased and vice versa. This is represented by the block 41.

The ride height of the vehicle at each vehicle point can be computed from the average extension of the ram and it is therefore possible to modify the attitude or ground clearance of the vehicle by an external input to each ram controller. The suspension ram moves to its new average position and the air spring pressure is automatically adjusted to suit. This is represented by the ride height control block 42 which receives as a primary input the output from the ram position transducer.

In a similar manner, a series of strong downward acting (body lifting) electromagnetic forces to all wheels caused by the reaction of the vehicle to rough terrain will automatically cause the gas spring pressures to increase and the ride height to increase. A programmed bias arrangement may be introduced to allow the vehicle to move automatically from low ground clearance on a smooth surface to high ground clearance on a rough surface.

From the above description, it should be clear that the magnitude and direction of the currents flowing in the electromagnetic ram are continuously sensed so as to provide a signal for use with an associated gas spring pressure control system. The current signals are continuously integrated (or the square of the current signals or any parameter derived from or related to the current signal or the square of the current signal) and then compared with positive or negative threshold values so as to control the gas spring pressure. Particular vehicle orientations can be forced on the suspension unit in order to provide automatic "banking" of a vehicle into a turn by sensing the vertical force vector and modifying individual wheel height demands. Further, it can be used to cause a vehicle to "kneel" for goods access or to allow disabled persons access to public service vehicles and the like.

A further advantage of the system is that different levels of sophistication can be built into the same basic electrical and mechanical construction. This varies from the full active suspension system into a semi-passive variable rate damper through a preset rate damper system and finally to a gas spring only mode. It will be appreciated that the fully active system could be provided with appropriate fallback positions so that it would fail gracefully through a number of modes through to a final ride on rubber end stops. In other words, the fully active system could full into a mode where it serves as a semi-passive variable rate damper where energy for generating forces is derived from wheel motion in a vertical direction thus relieving the central storage reservoir of the need to supply all of the power for force generation. The next mode of degradation is that the damper system is no longer controlled but just has fixed damping in place across the stator thus corresponding to an hydraulic damper. However, gas spring pressures are still turned in accordance with the direction of the currents flowing in each damper. The next mode of degradation is that the vehicle is supported only by the gas spring with only internal friction damping.

Nevertheless, the spring pressures continue to be turned automatically to bring the vehicle to the best height and attitude appropriate to driving conditions. The next mode is to remove the turning of the gas springs and set them all to be a default pressure and finally to slow the vehicle to ride on bump stops only.

All or only a selection of the above modes may be provided as desired.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A suspension system for maintaining a member in a desired orientation with respect to a datum surface, the system comprising a surface engaging means, a suspension unit connected between the surface engaging means and the member, wherein the suspension unit performs at least one of a force application function and a force absorption function with respect to the surface engaging means, the suspension unit having a predetermined basis characteristic, and an electrical device for modifying the basis characteristics of the suspension unit, characterised in that the suspension unit is formed by two cylindrical members (11,12) one sliding within the other to form a chamber of variable volume, filled with a gas, and in that the electrical device comprises means forming a series of alternating magnetic poles along the length of one of the cylindrical members (12) and armature means (16) forming magnetic poles in proximity to the end of the other cylindrical member (11), magnetic poles of one of the cylindrical members (11, 12) being formed of permanent magnetic material, wherein the electrical device is controlled by control means (40, 41, 42) to perform a predetermined function, and wherein the control means (41) controls the pressure of gas in the chamber.

2. A suspension system according to claim 1 wherein the electrical control means alters the damping characteristic of the suspension unit.

3. A suspension system according to claim 1 wherein the control means (40) is arranged to apply force to the suspension system in order to expand the volume of the chamber.

4. A suspension system according to claim 1, wherein one of the cylindrical members (12) is provided with a hard, smooth bearing surface.

5. A suspension system according to claim 4, wherein said other one of the cylindrical members (11) is provided with a hard, smooth bearing surface.

6. A suspension system according to claim 1, wherein the armature means (11) is provided with a hole (18) through an end wall (18).

* * * * *